(12) United States Patent
Qian et al.

(10) Patent No.: US 7,359,365 B2
(45) Date of Patent: Apr. 15, 2008

(54) HYBRID CDM/TDM SIGNALING FOR PACKET ACKNOWLEDGMENT METHOD AND APPARATUS

(75) Inventors: Feng Qian, Mission Viejo, CA (US); Stanislaw Czaja, Cardiff, CA (US)

(73) Assignee: VIA Telecom Co., Ltd., Cayman Islands (IO)

( * ) Notice: Subject to any disclaimer, the term of this patent is extended or adjusted under 35 U.S.C. 154(b) by 244 days.

(21) Appl. No.: 11/154,931

(22) Filed: Jun. 15, 2005

(65) Prior Publication Data
US 2006/0007876 A1    Jan. 12, 2006

Related U.S. Application Data

(63) Continuation-in-part of application No. 10/866,008, filed on Jun. 10, 2004, now Pat. No. 6,930,992.

(60) Provisional application No. 60/580,812, filed on Jun. 18, 2004, provisional application No. 60/480,474, filed on Jun. 19, 2003.

(51) Int. Cl.
*H04B 7/216* (2006.01)

(52) U.S. Cl. .............. 370/342; 370/236; 370/335; 370/328; 370/327

(58) Field of Classification Search ............ 370/342, 370/236, 335, 328, 327, 330, 336, 337, 343, 370/345
See application file for complete search history.

(56) References Cited

U.S. PATENT DOCUMENTS

| | | | |
|---|---|---|---|
| 5,267,244 A | 11/1993 | Messerschmitt et al. | |
| 5,278,992 A | 1/1994 | Su et al. | |
| 5,398,258 A | 3/1995 | Su et al. | |
| 6,434,367 B1* | 8/2002 | Kumar et al. | 455/70 |
| 6,507,572 B1* | 1/2003 | Kumar et al. | 370/335 |
| 6,571,101 B1* | 5/2003 | Schulz | 455/450 |
| 6,757,270 B1* | 6/2004 | Kumar et al | 370/342 |
| 2002/0089956 A1* | 7/2002 | Haugli et al. | 370/335 |

OTHER PUBLICATIONS

"Physical Layer Standard for cdma2000 Spread Spectrum Systems", 3GPP2 C.S0002-C, Version 1.0, Release C, pp. 1-2-1-3, 1-5-1-6, 1-9-1-12, 1-14-1-15, 1-17, 1-19, 1-21, 1-23, 2-55, 2-68, 2-71-2-72, 2-81, 2-140-2-146, 2-148, 2-161-2-162, 2-173, 2-179, 2-186-2-187, 2-221-2-224, 3-7-3-8, 3-18, 3-23, 3-37, 3-107-3-109, 3-133, 3-137, 3-145-3-149, 3-163, 3-173, 3-200, and 3-202, May 28, 2002.

* cited by examiner

*Primary Examiner*—Matthew Anderson
*Assistant Examiner*—Tuan Pham
(74) *Attorney, Agent, or Firm*—Jaquez & Associates; Martin J. Jaquez, Esq.; William C. Boling, Esq.

(57) ABSTRACT

A common signaling channel (CSC) conveys signaling information units (SIUs) from a base station (BS) to each of a multiplicity (e.g., 1200) of different mobile stations (MSs). Implicit correspondence between particular CSC and data frames is facilitated by basing CSC frame duration on the data frame period. CSC frames are time multiplexed into K subframes, which are code division multiplexed (CDM) into J CDM branches to define J*K SIUs. CDM symbols (or sequences) representing each SIU may be diversely transmitted in different time slots, and/or using different OVSF codes or subchannels. Unique gain may be provided for each SIU. Subframe duration may ensure CDM code orthogonality despite fading. CDM symbol length may be an integer power of two, or have other values, such as $2^N*20$ (e.g., 80). SIUs are typically relevant to BS-MS data packets, for example ACKs supporting H-ARQ for reverse link transmissions.

22 Claims, 5 Drawing Sheets

*FIG. 7*

$$H_{2N} = \begin{bmatrix} H_N & H_N \\ H_N & -H_N \end{bmatrix}$$

$$H_{20} =$$

HYBRID CDM/TDM SIGNALING FOR PACKET ACKNOWLEDGMENT METHOD AND APPARATUS

This application claims priority under 35 USC 119 to U.S. Provisional Application No. 60/580,812, entitled "Hybrid CDM/TDM Signaling for Packet Acknowledgement", filed Jun. 18, 2004, and is a continuation in part of commonly owned and U.S. patent application Ser. No. 10/866,008, entitled "Hybrid CDM/TDM Signaling for Packet Acknowledgement," filed Jun. 10, 2004 now U.S. Pat. No. 6,930,992, which in turn claims priority under 35 USC 119 to U.S. Provisional Application No. 60/480,474, filed Jun. 19, 2003, entitled "Hybrid CDM/TDM Signaling for Forward Link CDMA System". All three above-cited patent applications are hereby incorporated by reference herein in their entirety.

BACKGROUND OF THE INVENTION

1. Field of the Invention

This disclosure generally relates to wireless communications, and more specifically to communications systems that transfer data between a base station and a multiplicity of user stations.

2. Related Art

The state of the art for CDMA communications systems is substantially reflected in documents published by standardization bodies. The primary published standard that preceded the subject matter presented herein is identified as 3GPP2 C.S0002-C, "Physical Layer Standard for cdma2000 Spread Spectrum Systems," published May 28, 2002, which is hereby incorporated herein in its entirety by reference. According to that standard, CDMA cellular communications devices may be enabled for high-speed packet data together with voice communication. Devices so enabled shall include a number of different physical channels. Although the disclosed method and apparatus presented herein were developed in this context, those skilled in the wireless communications art shall recognize that the improvements are applicable to other systems as well. A salient characteristic of such systems is their provision for packet data transfers between a base station and numerous mobile (or user) stations.

As is well known, cellular communications systems generally employ portable transceivers, each of which is called a mobile station ("MS"), for user communications. Such systems are one-to-many in nature, and generally include a relatively modest number of base stations ("BSs") that each communicate with many MSs. The BSs are disposed as needed throughout geographical areas, to satisfy user demands for range and connection volume. For cellular systems providing high-speed packet data communications, the BS infrastructure must also satisfy user requirements for data volume.

Cellular system capacities are constrained by a variety of factors, such as the RF spectrum available to them, which limit the number of MSs that each BS can service. The economic value of a base station depends largely upon the number of MSs that can be concurrently served by the base station at a given level of quality of service. Thus, there is a need to increase the number of MSs that a base station is capable of serving, within system constraints, based upon bandwidth availability and quality of service requirements.

To receive information accurately, wireless communications systems require an adequate signal-to-noise ratio (SNR). CDMA systems equivalently require a sufficient $E_c/I_0$ (energy per chip divided by the total energy within the spectral band used by the signal). With respect to a subject MS, the power of transmissions from its serving BS to other MSs appear as an increase in the total energy within the relevant spectral band, causing a decrease in the $E_c/I_0$ as measured by the subject MS. Thus, in the interest of increasing the number of MSs that can be served, and the rate of data transfer that can be provided, it is desirable for communications to take place at the lowest power levels that provide reliable operation.

Various efficiency-enhancing techniques have been implemented in cellular systems to help satisfy the need for high-speed data transmission at minimal power levels. For example, rather than transmit at a power that is sufficient to ensure accurate reception of every data packet, downlink data transmissions from a BS to an MS typically use an H-ARQ (hybrid automatic request for retransmission) procedure, whereby an MS will request retransmission when a particular data packet is lost. Transmit power levels can thus be reduced until some packets are lost due to variations in statistical noise. The resulting reduction in average transmission power levels frees capacity that may be used to accommodate additional users.

H-ARQ procedures may be implemented to improve an efficiency of high-speed data transfers on the reverse link (RL), whereby the BS will request retransmission from an MS in the event of a dropped data packet. This imposes a requirement for a BS to acknowledge, on a forward link channel, data packets received from an MS. In order to conserve bandwidth, both in terms of transmission power and quantity of data overhead, the RL H-ARQ system needs to be efficient and reliable, which in turn requires that the forward link acknowledgement be maximally reliable with minimal transmission power requirements. Responsive to the needs set forth above, a signaling method and apparatus is disclosed herein that may be implemented in a cellular communications system to improve the efficacy of cellular system RL data communications by reducing the overhead required to effect automatic retransmission.

SUMMARY

A method and apparatus is described herein providing improvements in efficient use of shared signaling channels primarily with wireless communication system forward links from a base station ("BS") to a multiplicity of mobile stations ("MSs").

One embodiment comprises a method of transmitting a multiplicity of signaling information units (SIUs) from a base station (BS) to a corresponding multiplicity of receiving mobile stations (RMSs) via a common signaling channel (CSC). In accordance with the disclosed method, substantially more data may be communicated between each RMS and the BS in primary data frames than is conveyed by corresponding SIUs. The disclosed method includes identifying primary data frames to which the SIUs are relevant, and transmitting the SIUs in a CSC frame at a time that implies correspondence between such primary data frames and the SIUs. The embodiment also includes time division multiplexing (TDM) the CSC frame into multiple subframes, and disposing a CDM sequence representing each SIU in a subframe for individual reception by an MS to which the SIU is directed. The CSC frame may be either approximately the same duration as the primary frame, or, alternatively, significantly shorter.

Another embodiment comprises cellular communication system base station (BS) apparatus for high-speed data communication with multiple mobile station (MS) receivers.

This embodiment includes a data channel frame analysis module that determines a duration and time alignment for primary frames of multiple data channels. This embodiment includes a common signaling channel (CSC) signal preparation module to prepare a signal segment that conveys multiple signaling information units (SIUs), each corresponding to one of the multiple data channels, for transmission on the CSC from the BS as a particular CSC frame. The CSC signal preparation module includes a time division multiplexing (TDM) module to dispose SIUs into different subframes of a CSC frame corresponding to the primary data frames, a coding module to encode each SIU as a code division multiplexed (CDM) symbol, and a time diversity module to dispose a CDM symbol representing each SIU in different subframes of the CSC frame. It also includes a plurality of CDM branch concatenation modules, each concatenating CDM symbols (based on a particular orthogonal sequence cover) for all subframes of the CSC frame as CDM branch frame sequences. The CSC signal preparation module also includes a summation module to sum CDM branch frame sequences and establish a signal segment that reflects the CSC frame information.

BRIEF DESCRIPTION OF THE DRAWINGS

Embodiments of the present invention will be more readily understood by reference to the following figures, in which like reference numbers and designations indicate like elements.

FIG. 7 illustrates construction of Hadamard codes of length $20(2^N)$, wherein N comprises a positive integer.

DETAILED DESCRIPTION

Introduction

Figure 1:
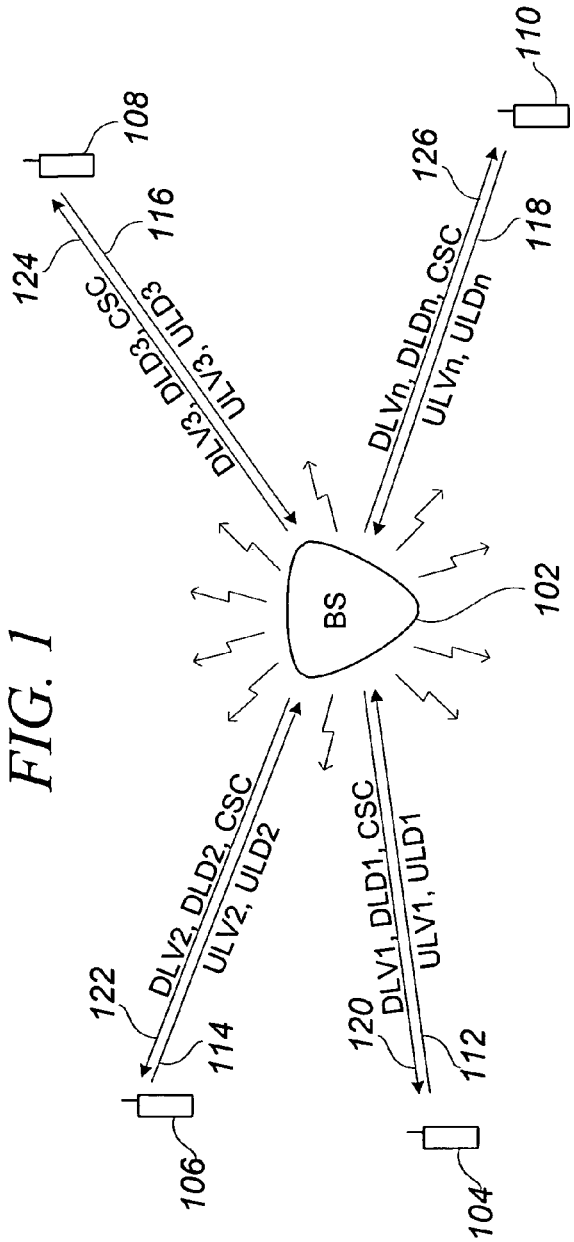
FIG. 1 is a simplified diagram illustrating features of a general cellular communication system, showing wireless communications between a base station (BS) and a multiplicity of mobile stations (MSs).

Many wireless communications systems, and particularly cellular systems, seek to improve high-speed data communication speeds between units. In order to operate at a minimal transmission power level without sacrificing data integrity, H-ARQ (hybrid automatic retransmission request) procedures may be employed with respect to data transmissions in one or both directions. The benefits of automatic retransmission are obtained at a cost of increased overhead that is required for a receiving station to inform the sending station of the status of received packets. An improved method and apparatus for a common signaling channel ("CSC") is set forth below, which may be employed to convey such status information (acknowledgements). Details are described that are directly applicable to a CDMA cellular telephone system, which, as an exemplary wireless communication system, provides the context for at least one embodiment of the method and apparatus described herein.

H-ARQ protocols may be useful for reverse link (RL) data transmissions from mobile stations (MSs) to base stations (BSs). Typical H-ARQ implementation for data transfer in one direction requires the transmission, in the other direction, of acknowledgement of correctly received data. Acknowledge information (or "ACK") generally requires very little data, and indeed is often implemented as merely the presence or absence of a signal on a particular channel. ACKs are most useful if conveyed promptly so that the data source need not retain previously transmitted data for a long period while awaiting acknowledgment that the data was correctly received.

ACKs are typically organized into a frame structure in preparation for transmission. If the frame structure has a duration that matches the duration or period of relevant data frames (the data being acknowledged), and if the ACK frames are transmitted at a predetermined time after such relevant data frames, then a significant amount of data may be implicitly conveyed. By simply disposing ACKs in a frame having a predetermined timing relationship to a frame (or packet) of data being acknowledged, explicit identification of the particular frame (or packet) to which the ACK applies is rendered unnecessary. Explicit frame identification would require more information than is needed for the ACK itself. Accordingly, there is strong motivation to base an ACK channel frame structure on the frame structure of the channel for which data is being acknowledged, and to establish a known timing relationship between a selected ACK and the data acknowledged by the selected ACK.

An ACK, of course, is necessarily specific to a particular unit of data (e.g., a frame or packet of data) that is acknowledged by the ACK. For example, an ACK may be specific to the data of a particular frame of a particular data channel. Yet, for efficiency response, the ACK desirably contains far less data than does the acknowledged data unit. Accordingly, the ACK will preferably be transmitted on a channel having a very low data rate compared to a data rate of the data channel. In some exemplary systems, such a very low data-rate channel may be established by extensive multiplexing of a common signaling channel (CSC).

In an exemplary CDMA system embodiment, for example, forward link ("FL," i.e., from a BS to an MS) ACK data may be conveyed to an MS from which the BS is receiving packet data on a special FL channel, which is designated a Forward Link Common Acknowledgment Channel ("F-CACKCH"). Such a channel is one-to-many, intended to provide information that is specific to each of a large number of different receiving stations. Thus, acknowledgement information specific to n different MSs may be concurrently transmitted on such an FL channel. Due to considerations beyond the scope of this application, the exemplary CDMA system provides a positive acknowledgement ("ACK") or a negative acknowledgment ("NACK"), as appropriate, to each of 96 different MSs in the same frame of the F-CACKCH. This distribution may be achieved by multiplexing the F-CACKCH to function as 96 distinct channels. The skilled person will understand that the F-CACKCH (or other CSC) may be multiplexed into any number of effective channels, within bandwidth constraints, with the implementation of corresponding changes to other features, as necessary. Examples are described subsequently herein.

The desired multiplexing of the F-CACKCH may be effected, for example, using either code division multiplexing ("CDM") or time division multiplexing ("TDM") techniques. Reverse link ("RL," i.e., from an MS to a BS) data may be transmitted in the exemplary CDMA system using a frame having a duration of 10 mS. Accordingly, the F-CACKCH also has a 10 mS framing structure in order to implicitly identify the specific frame of a data channel to which an ACK pertains. Employing well-known "Walsh" codes, or other distinguishable coding schemes, a single 10 mS frame of the F-CACKCH may be subdivided into 96 CDM (code-distinguished) subchannels, each CDM subchannel conveying one acknowledgment per frame. For example, the F-CACKCH may employ two symbols to convey an ACK, in which case 192 symbols will be required to convey ACKs for 96 subchannels. Within a 10 mS frame, 192 distinguishable symbols may be conveyed using a length 64 Walsh code pattern. Two symbols convey a unit of information (e.g., ACK) for one subchannel. Each active MS may be assigned to one of the 96 F-CACKCH subchannels thus established, by means of higher-level protocol signaling.

However, a problem may arise for such CDM subchannels when the transmission is subject to fading, particularly when the fading is due to relative movement between the transmitting and receiving stations. Relative velocities between a BS and an MS in a cellular system may readily reach 100 km/hr, which will cause Doppler-effect fading at a rate of approximately 200 Hz. Accordingly, two full fading periods may be encompassed within a single 10 mS frame. It is likely that orthogonality of the different codes will be lost under such fading circumstances, causing excessive detection errors. Significant errors on the F-CACKCH may severely impair data transmission integrity, particularly considering that the data transmission itself is subject to the deleterious fading environment.

To avoid impairment of data integrity, time division multiplexing (TDM) may be employed instead of CDM. The basic 10-mS frame may be multiplexed into 96 TDM subchannels by subdividing the 10 mS frame into 96 subslots, each TDM subslot having a duration, for example, of about 104 µS. Such an arrangement would solve the Doppler fading issue, because expected MS movement would not cause significant fading over such a short time period. However, such TDM subdivision creates a higher peak to average power than does CDM transmission, as described below in more detail.

Substantial average power savings may be realized by sending a signal on the F-CACKCH only when required to indicate a negative acknowledgement ("NACK"), which is expected to be less commonly required than a positive acknowledgement ("ACK"). In this manner, a majority of acknowledgement information (i.e., the more common positive ACKs) may be conveyed expending no transmission power at all, because only NACKs employ transmission power. Accordingly, in a TDM F-CACKCH, 104 µS bursts of transmission power will appear occasionally in an otherwise silent channel, creating an undesirably high peak-to-average ratio for the channel signal. Thus, if ACKs (no signal) are sent many times more frequently than NACKs (signal present), then the resulting peak-to-average power ratio of the F-CACKCH increases significantly. As is well known, high peak-to-average ratio signals exacerbate problems of transmitter distortion and co-channel interference.

Irrespective of the potential loss of code orthogonality for 10 mS symbol periods, multiplexing the F-CACKCH into 96 subchannels is inconvenient. In general, orthogonal codes may be implemented more efficiently by dividing a particular channel into a number "$N_{CS}$" of CDM symbols, where $N_{CS}$ is 2 raised to an integer power. Thus, for example, it will be more efficient to divide a channel into 64 or 128 CDM symbols, rather than into 96 or 192 CDM symbols.

Overview

A generalized method of providing an efficient common signaling channel (CSC), as well as appropriate apparatus therefor, is set forth below. The method and apparatus addresses some of the difficulties identified above. Such an efficient CSC is particularly useful for relatively low data-rate signaling information that implicitly corresponds to a frame structure designed for a higher data-rate channel, such as a voice or high-speed data communication channel. In the exemplary CDMA communication system, the F-CACKCH may be configured as a CSC to efficiently and accurately provide concurrent ACKs in respect of a large number of different RL data channels. However, CSCs may be employed for many other purposes, both in other CDMA systems and in other types of communications systems having a cellular, one-to-many architecture. In regard to RL data communications, for example, a CSC may be employed to direct modification of communication parameters (such as, for example, transmit power, modulation, and coding scheme) on a nearly per-frame basis. In regard to DL data communications, a CSC may be employed to indicate low-rate, frame-relevant information. For example, a CSC may be used to indicate whether a near-future data frame will include information for a particular MS, or to indicate that a change, such as in coding scheme or Walsh space, will be made to signals for data directed to a particular MS.

FIG. 1 illustrates features of a general cellular communications system, including a base station (BS) 102 capable of bidirectional voice and data communication with a multiplicity of mobile stations (MSs). Examples of MSs are represented by MS1 104, MS2 106, MS3 108, and MSn 110. MSn 110 represents the $n^{th}$ device serviced by the BS 102. In exemplary CDMA cellular systems, n may comprise, for example, 96 or 192. For visual clarity, the BS 102 is shown in the geographic center of the represented MSs, but, in practice, these related MSs may be served by a single sector of a BS, covering, for example, only a 120 degrees angle from the BS 102.

Uplink ("UL") transmissions 112 from MS1 104 to the BS 102 may include transmissions over a voice channel such as is represented by "ULV1," and/or over one or more data channels, as represented by "ULD1." UL transmissions 114, 116 and 118 from MSs 106, 108 and 110, respectively, similarly may include transmissions over a representative voice channel "ULV*," and/or over a representative data channel "ULD*," where the "*" symbol represents an integer that may be arbitrarily selected to designate a specific MS. Downlink ("DL") transmissions 120, 122, 124 and 126, similarly may include a voice channel, represented by DLV* (where the "*" symbol comprises the MS-designating integer), and/or one or more data channels, represented by DLD*, from the BS 102 to the MSs 104, 106, 108 and 110, respectively.

Each MS 104-110 also receives DL transmissions over a common signaling channel ("CSC"). A CSC may be distinguished by a combination of some of the following characteristics. A CSC may convey information, at relatively low rates, to a relatively large number of MSs to which the CSC is "common." CSC signaling information may be limited to channel administration tasks, rather than to conveying actual data, such as voice or file data, between users. CSC signaling information units (SIUs) may be relevant to particular data frames (or packets) on particular channels. A CSC may convey such relevance implicitly by disposing the SIUs within a CSC frame having a predetermined timing relationship to the relevant data frame (or packet). CSC frames are also referred to as "CSC superframes" or simply "superframes" to underscore that they are time divided into multiple subframes or slots. The predetermined timing relationship may include making a duration of the superframe substantially equal to a period or duration of the relevant data frame or packet, and/or may include transmitting a CSC superframe at a predetermined time with respect to the relevant data frame or packet. A CSC may be limited to conveying SIUs that are each unique to specific MSs. Particular characteristics that may be typical of a CSC are, nonetheless, not required in all embodiments. In some embodiments, for example, a CSC may carry data between users, particularly at low rates. In some embodiments, a CSC may be common to a modest multiplicity of MSs. Also, in some embodiments, SIUs may be common to more than one MS.

Because a CSC is "common," the CSC is indicated in FIG. 1 without a numeral suffix corresponding to a target MS. Nonetheless, the CSC typically will convey information uniquely and individually relevant to each of the multiplicity of MSs that share the CSC. The exemplary F-CACKCH, for example, will desirably convey either an ACK or a NACK to each of up to 96 different MSs during a single frame period of a UL data channel. Thus, the F-CACKCH is highly multiplexed, conveying information to corresponding MSs on each of 96 (in the exemplary embodiment) distinct subchannels. During connection setup, higher processing level information enables each MS that shares the F-CACKCH to identify the relevant portion(s) or subchannel(s) of the F-CACKCH. Typical CSCs are similarly highly multiplexed to provide distinct subchannels to many MSs or users.

Implicit Framing Relationships

Figure 2:
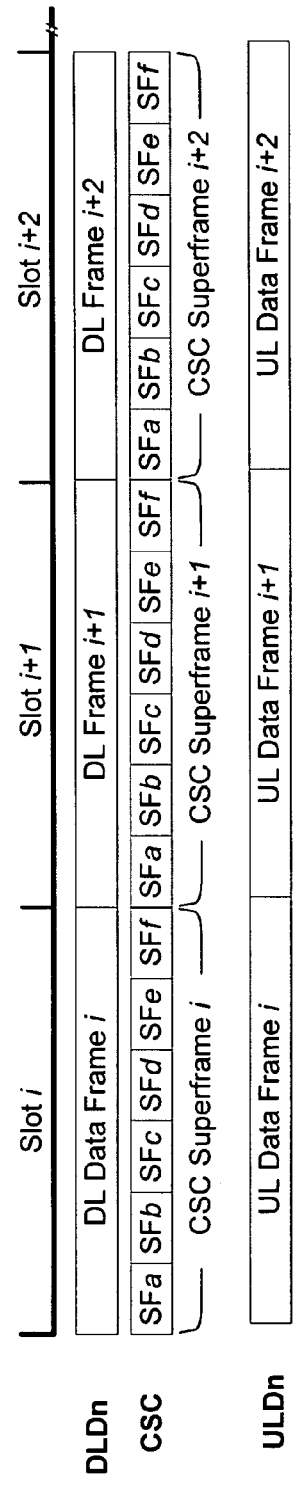
FIG. 2 illustrates a frame structure showing relationships between framing of a common signaling channel (CSC) and framing of representative related data channels.

FIG. 2 illustrates a frame structure showing exemplary CSC superframes and exemplary subframes. Each illustrated CSC superframe i, i+1 and i+2 encompasses a plurality of subframes. In the example illustrated, each CSC superframe encompasses six subframes SFa-SFf. Superframes comprising six subframes are convenient for the exemplary CDMA system, permitting 96 CSC subchannels to be conveyed (using two symbols per subchannel) within a single CSC superframe. Each such subframe requires a capacity of only 32 CDM symbols. Thus, the subframes may be divided into a convenient and efficient (2 to an integer power) number of CDM symbols.

The slots of FIG. 2 may have any duration. In the exemplary CDMA system, F-CACKCH superframes have a 10 mS length matching that of UL Data Frames. As shown in FIG. 2, each CSC superframe is divided by TDM into six subframes. In the exemplary CDMA system, therefore, each CSC (F-CACKCH) subframe is less than 1.7 mS long. Because the CDM code lengths are limited to the subframe duration, code orthogonality is accordingly less likely to be lost due to relative motion. For subframe lengths less than 1.7 mS in duration, for example, no more than ½ fading period will be experienced in the exemplary system due to relative motion between an MS and its associated BS of up to 150 km/hr (about 90 mph).

FIG. 2 also illustrates typical relationships between a CSC and frames of a related data channel, as viewed at a BS. For example, the CSC may provide ACK information for a UL data channel having a frame structure as shown for the representative UL data channel ULDn. Viewed at the BS, a UL data channel slot (e.g., slot i) will tend to be offset with respect to a corresponding DL timing slot i. Such offset may be due to the propagation delays, such as signal travel time, between transmission of a DL frame (or pilot sequence) and arrival of a UL signal that was aligned with the DL frame at the MS. The offset may also be substantially due to alignment offsets (e.g., PN offsets) that are intentionally imposed on selected MSs for reasons of system efficiency. In FIG. 2, such offsets are reflected in a visible lag of UL data frames (as viewed from the BS), compared to the timing of slots i, i+1 and i+2.

Typically, relevance of SIUs to particular frames of a corresponding data channel is implied by the transmission time of the CSC superframe containing the SIUs. In the exemplary CDMA system, for example, SIUs of the F-CACKCH convey ACK information. Transmitting an ACK within the CSC (or F-CACKCH) Superframe i+2, for example, implies that the ACK is relevant to a particular frame (e.g., Data Frame i) of the corresponding data channel. Such implicit information may be conveyed by any predetermined mapping between CSC superframes and frames of the corresponding data channel that is accepted by both BS and MS. The specific mapping may be selected to satisfy engineering considerations. As examples of such considerations, data storage requirements may be reduced by transmitting ACKs as quickly as possible after the relevant data packet or frame is decoded, but some extra delay may be useful to ensure that the predetermined timing relationship may be maintained over unusual channel conditions. The timing relationship between CSC superframes and the relevant UL data frame will typically be established during connection setup.

CSC Functional Alternatives

In the exemplary embodiment, the CSC (F-CACKCH) conveys SIUs (ACK information) related to a previous frame of a UL data channel, but there are many other possibilities. CSC SIUs may convey information relevant to particular MSs for future (rather than previous) UL data frames, such as permission to transmit in particular frames, or instruction to effect a change in modulation scheme, Walsh space, or transmit power level beginning in a particular future frame. In such a case, SIUs transmitted within CSC Superframe i may, for example, be relevant to UL Data Frame i+1 or i+2.

As another example, a CSC may convey SIUs that are relevant to a DL data channel, rather than to a UL data channel. Such SIUs may indicate, for example, whether a particular frame includes information relevant to a particular MS, what portion of data in such a frame is relevant, or the coding or modulation scheme that will be employed in such a frame. Thus, any information that is relevant to particular frames of another channel may benefit from transmission via a CSC, particularly low-rate information that is individually specific to numerous different MSs (or numerous groups of MSs).

Also, although FIG. 2 refers only to data channels, a voice channel in a digital system comprises a data channel that conveys data that is representative of voice information. Thus, the illustrated data channels DLDn and ULDn generally represent any communication channel to which SIUs of a CSC are implicitly relevant.

In FIG. 2, data frames to which the CSC relates are shown as continuous (i.e., they are concatenated with each other). This need not be the case. Instead, relevant data frames may occur periodically, at a predetermined time period. For example, an agreed upon protocol may establish that only even UL data frames, such as the UL Data Frames i, i+2, and so on, are relevant to a specific CSC. In such a case, the superframe length for the CSC may be determined to match the period between relevant data frames, rather than matching the duration of relevant data frames. Thus, in the illustrated example, superframes of the CSC may match the two-slot periods of the relevant data frames, without impairing the ability of SIU transmission within a specific CSC superframe to implicitly identify the frame of the corresponding data channel to which the SIU is relevant.

In some embodiments, the frames indicated in FIG. 2 may include some time for alignment and power-control features, such as ramp-up and ramp-down periods occurring at a beginning and/or end of a frame, and/or for a preamble, typically occurring at a beginning of a frame. Such features are not employed in the exemplary CDMA system, which rely on a pilot signal for alignment, but may or may not be present in any other particular embodiment of a CSC. The use of preambles, alignment symbols, and power control features may cause the timing of CSC frames to differ somewhat from the timing of frames or packets of the corresponding data channel. However, the skilled person can readily dispose preambles and other special signal features as required, whether for frames, or for frame groups, in a particular system. Accordingly, such features are not described further hereinbelow.

Further Subframing Benefits

At least two additional benefits may follow from division of a CSC superframe (based on a frame duration or period of a corresponding data channel) into a plurality of subframes. First, such subdivision may permit the number of CDM symbols that the channel is configured to convey during each subframe to be an integer power of 2, such as 16, 32, 64, etc. Sometimes it will be desirable to divide a CSC into a number of subchannels that does not lend itself to use of a convenient integer power of 2 number of CDM symbols. Indeed, such is the case with the 96 subchannels desired for the exemplary CDMA system. In this case, by dividing the superframe into a multiple of 3 subframes, the number of symbols that each subframe is configured to convey may be set to an integer power of 2. In other embodiments, of course, other divisions may be necessary to enable efficient use of an integer power of 2 number of symbols in each subframe, if this is desired. In some cases it may even be useful to establish subframes of different lengths within a single CSC superframe.

Second, information for each CSC subchannel (i.e., for each receiving MS), may be repeated within the same superframe period, thereby enhancing a probability of accurate detection of the information by time diversifying the signal. As described previously, system efficiency may be highly dependent upon the integrity of information conveyed via the CSC. Time diversity of the CSC signals reduces the power levels at which the CSC must be transmitted to ensure accurate reception. In some embodiments, time diversity may be employed only for MSs that receive less effectively. This flexibility may be particularly useful in view of the large number of different MSs that may share a CSC, which will generally entail tolerating a wide range of channel conditions, from strong to weak, and variable. The weaker and more variable channels may particularly benefit from time diversity. For such channels, the information units (e.g., ACK or NACK) may be repeated once, twice, or even in every subframe, within a given CSC superframe.

Reverse link data channels (relevant to the F-CACKCH) are structured in frames having a length of 10 mS in the exemplary CDMA cellular system. The frame of the F-CACKCH in the exemplary CDMA system may be multiplexed, for example, into 96 or 192 subchannels. If time diversity of two is employed for each subchannel, 96 different MSs may receive acknowledgment information on the F-CACKCH. A single CDM symbol may suffice to convey ACK or NACK to each of the different MSs. Despite the overall division into 96 time-diversified (or 192 non-time-diversified) different subchannels, an efficient and convenient 32-symbol (integer power of two number of symbols) code may be employed to code multiplex each subframe.

Base Station Apparatus Features

Figure 3:
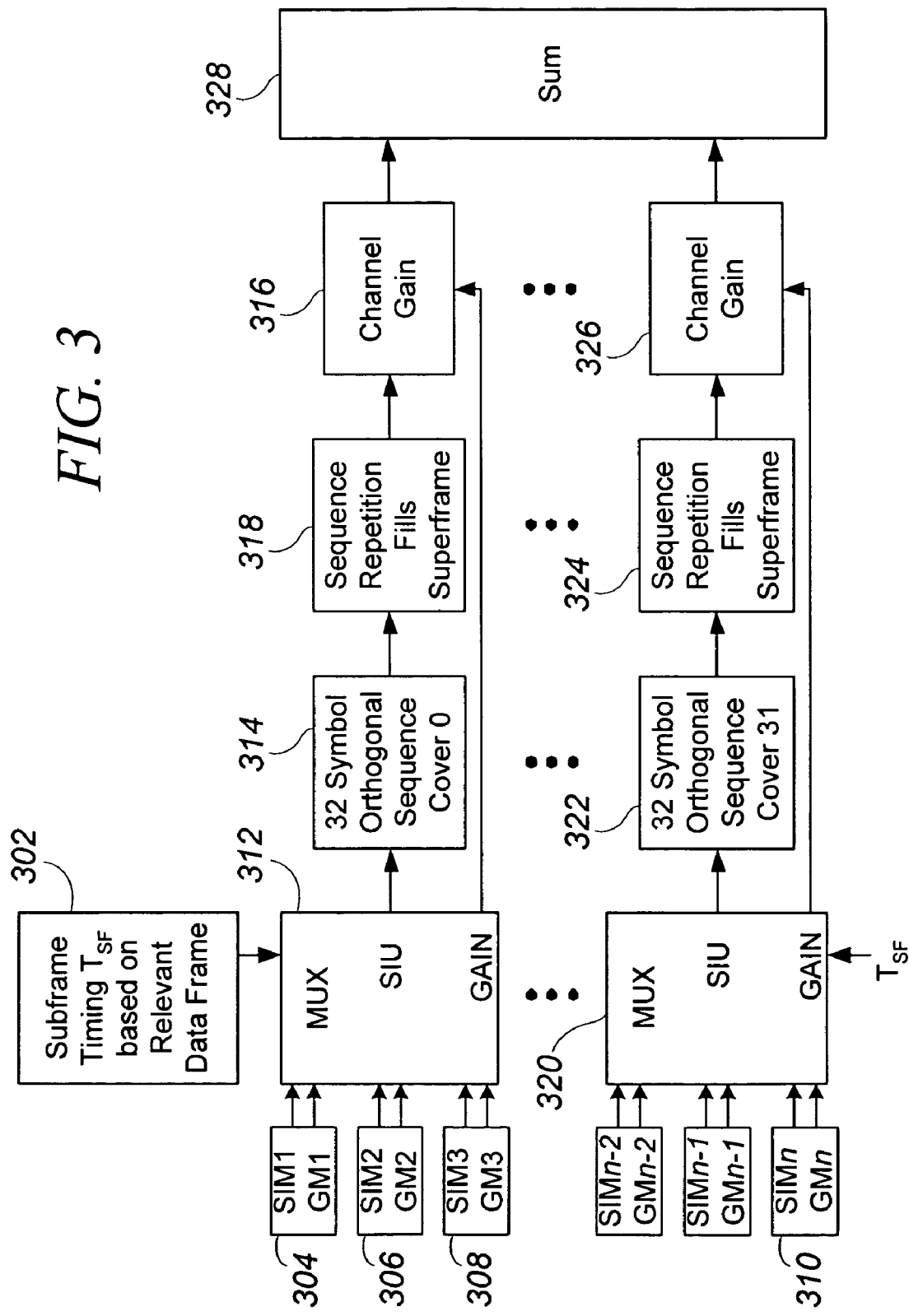
FIG. 3 is a block diagram of base station apparatus modules for preparing a common signaling channel (CSC) for transmission to a multiplicity of receiving MSs.

FIG. 3 illustrates some features of a representative BS transmission system configured to support a CSC. The skilled person will readily adapt the features that are illustrated and described herein to suit the needs of a BS for use in a particular communications system. The channels referenced in FIG. 3 correspond to the channels illustrated in FIG. 1, and are merely representative.

In FIG. 3, a block 302 represents BS features that cooperate to determine subframe timing signals $T_{SF}$. The $T_{SF}$ timing signals are generally determined by the duration or period of relevant frames of a corresponding data channel. In the case that the corresponding data channel comprises a UL data channel, for example, the block 302 may encompass hardware configured to identify the timing and MS source of received signals, together with programmable circuitry to determine slot assignments for each received data frame. The block 302 may also include upper layer processing capabilities configured to determine a time relationship between UL data channel slots and corresponding DL slots for BS transmissions. The block 302 will further include features configured to identify or determine CSC superframe timing. Appropriate times for at least some subframes may be determined within the block 302 by dividing the duration of each superframe by the number of subframes, as predetermined by design or by upper layer processing. The subframes will typically, but not necessarily, have substantially equal length.

The actual SIUs to be conveyed by the CSC may be prepared by upper layer processing, and disposed into queues corresponding to the MS to which such SIUs are relevant. Upper layer processing may also determine an appropriate gain level for each MS. Blocks 304, 306, 308 and 310 represent SIU queues and gain values that have been prepared by upper layer processing for MSs MS1, MS2, MS3 and MSn, respectively. At appropriate times, as determined by the subframe timing determination block 302, a multiplexer 312 selects the SIU(s) and gain value corresponding to a particular MS (1, 2 or 3), and conveys such SIU(s), and such gain, to further channel processing blocks. Such further processing blocks may include an orthogonal coding sequence cover block 314, as well as a channel gain block 316. In the exemplary embodiment, just one SIU, representing a NACK or else an absence of signal, is selected from the appropriate queue by the multiplexer 312 during a subframe. The single SIU is encoded into a single symbol in the encoder 314, according to a predetermined one of 32 orthogonal sequences.

Time Diversity Alternatives

The multiplexer 312 need not necessarily provide both SIU(s) and gain to further channel processing blocks for each subframe period. In the illustrated embodiment, for example, the MUX 312 need only provide SIU(s) to the coding block 314 during three of six subframe periods in an exemplary CSC superframe. During the other three subframe periods, the encoded sequences from the coding block 314 may be duplicated in a block 318 to provide time diversity of the signal. The order of repetition may be selected based on various engineering considerations, but repeating subframes a, b and c (as shown in FIG. 2) during subframes d, e, and f provides greater time separation of the repeated signals.

Numerous variations are possible for providing time diversity of the information. For some CSCs, for example, it may be useful to employ two different SIU values to represent the same underlying information. For example, a convention may be established, according to which symbols disposed in one subframe are interpreted differently (e.g., inverted) as compared to the same symbol disposed in a different subframe. Such a convention may permit the same underlying information to be transmitted via different symbols, disposed in different subframes of the same CSC superframe, thus providing not only time diversity, but also signal diversity.

In some embodiments, it may be preferred to repeat only certain encoded sequences. Thus, for example, it may be desired to convey two different SIUs during a CSC superframe to each MS sharing the CSC. The first of these two SIUs may be critical to data integrity, and accordingly may be repeated for time diversity. The second of these two SIUs, however, may be less critical. For example, in a somewhat similar manner, symbols representing a more critical SIU may be repeated multiple times within a superframe, while symbols representing a less critical SIU are repeated only once, or not at all. Alternatively, repetition may be varied according to channel conditions, wherein SIUs directed to an MS on a less robust CSC subchannel are repeated, while SIUs directed to an MS on a more robust subchannel are not repeated. Further, the number of subchannels into which a CSC is divided may be reduced, depending upon traffic or channel conditions, and symbols for the remaining subchannels may then be (further) repeated. Thus, multiplexing a CSC into numerous effective channels permits tremendous flexibility for trading off data rate, power, and data reliability.

Similarly, as described above with respect to the multiplexer 312, a multiplexer 320 selects SIU(s) and gains from appropriate queues established by higher layer processing, such as the queue 310 that provides SIU(s) and gain relevant to MSn, in accordance with the subframe timing signal $T_{SF}$ generated by the block 302. The SIU(s) appropriate for a particular subframe are conveyed to a block 322 for orthogonal code covering according to an orthogonal sequence. The orthogonal sequence according to which the data is encoded is, for example, a different one of 32 orthogonal sequences than the sequence that is employed in the encoding block 314. Some, or all, of the subframe sequences thus generated in the encoding block 322 may be repeated in a block 324 to provide time diversity. Channel gain may also be modified for each subframe (and thus for each subchannel) in a gain block 326.

The multiplexing, coding, repetition and gain blocks 312, 314, 318 and 316, respectively, represent a first subchannel path, and the corresponding blocks 320, 322, 324 and 326 represent a last subchannel path. Any number of intermediate subchannel paths may be included. In the exemplary embodiment, there are a total of 32 generally identical subchannel paths. The output from all such paths may be combined in a block 328 as the entire signal of the CSC.

Additional General Base Station Features for CSC

Figure 4:
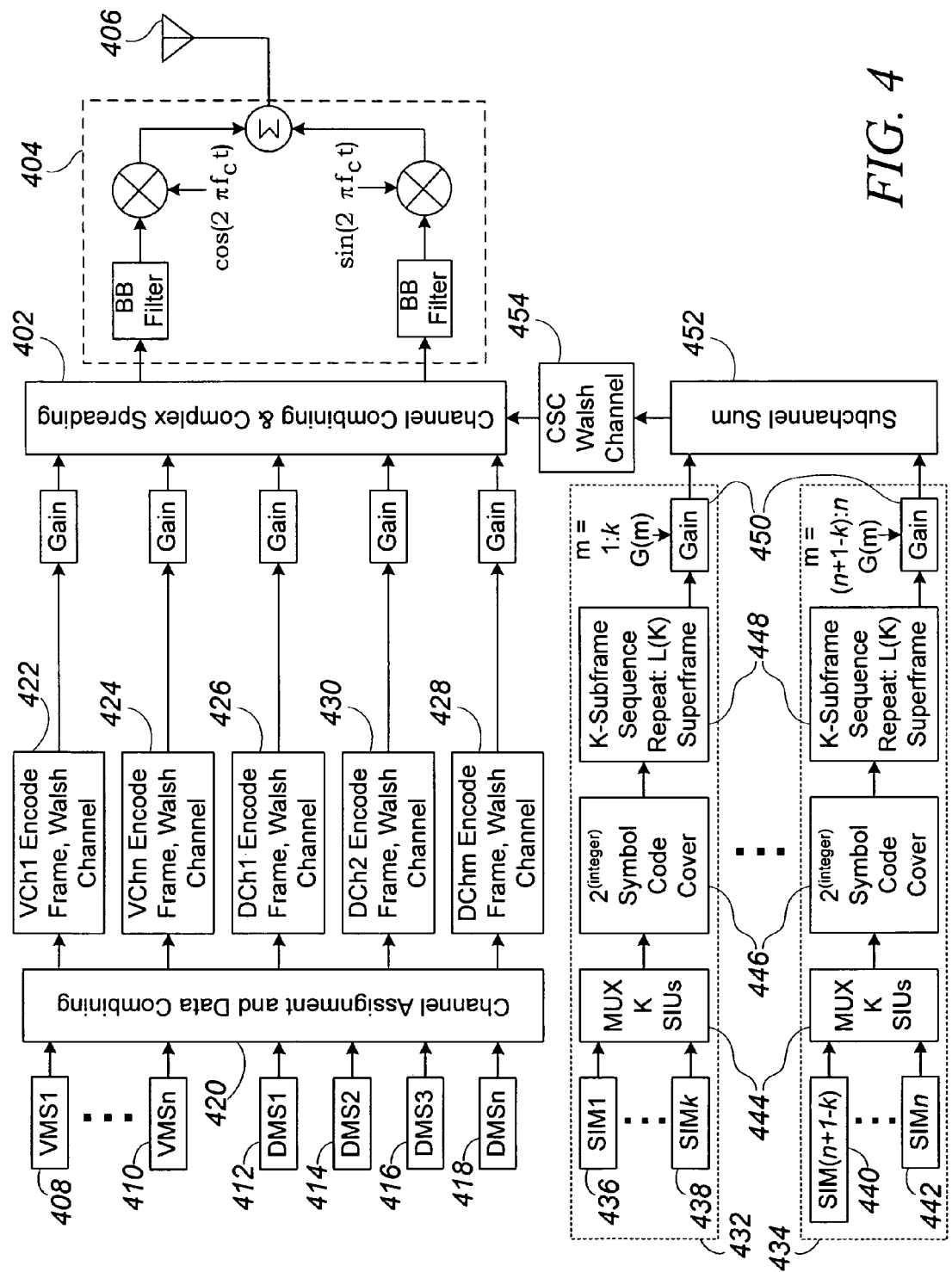
FIG. 4 is a simplified and generalized block diagram of portions of a base station apparatus configured for bidirectional data communications and capable of transmitting a common signaling channel (CSC) to a multiplicity of receiving MSs.

Relevant BS signal processing modules are represented somewhat more generally in FIG. 4. As described below in more detail, signals conveying information from a number of different channels may be combined in a single channel combining and complex spreading "crossbar" 402, wherein the channels are assigned to I or Q outputs. The I and Q outputs are baseband filtered, quadrature modulated, and summed in an antenna signal preparation block 404 for transmission from an antenna 406.

All of the channel data queues may be prepared by higher layer processing. These channels may include voice channels, represented by a queue VMS1 408 for a voice channel directed to MS1, and by a queue VMSn 410 for a voice channel directed to MSn. Data channels are represented by a queue DMS1 412 of data intended for MS1, a queue DMS2 414 associated with for MS2, a queue DMS3 416 associated with for MS3, and a queue DMSn 418 if data intended for MSn. Data from all of these queues may be directed, via a crossbar 420 controlled by upper layer processing, to appropriate channel processing paths.

For the sake of simplicity, examples of appropriate channel processing paths are illustrated opposite the queue(s) that provide the channel data. For example, one voice channel encoding, framing and Walsh channelizing block 422 is illustrated opposite the voice data queue VMS1 408, and another such block 424 is illustrated opposite the queue VMSn 410, suggesting the typical circumstance that a single channel is allocated for each voice channel. Similarly, separate data channel encoding, framing and Walsh channelizing blocks 426 and 428 are each positioned to suggest that they process data output only from the data queues DMS1 412 and DMSn 418, respectively. However, a data channel encoding, framing and Walsh channelizing block 430 is positioned to suggest that the block 430 processes data obtained from both of the queues DMS2 414 and DMS3 416. This arrangement is merely illustrative of a typical system, in which a data channel path processes data for one or two data channels. In a typical BS, assignment of queues to channel processing paths in the crossbar 420 is substantially under the control of upper communication processing layers.

CSC processing paths are represented by a first CSC processing path 432, which processes subchannels for the first k MSs 1 to k, and by a last CSC processing path 434, which processes subchannels for the last k MSs (n+1−k) to n. These CSC processing paths are generally similar to the paths illustrated in FIG. 3. However, the BS module that provides the subframe timing signals $T_{SF}$ to the multiplexers is not shown in FIG. 4, nor is an explicit multiplexer for the appropriate gain value for each subchannel.

Each path 432 through 434 conveys SIUs from k queues, which are generally intended for k different MSs. In an exemplary embodiment, the SIUs are ACKs which are usefully transmitted after the shortest consistent delay, so that the SIU queues may be a single register in length. The k queues are represented in CSC processing path 432 by a queue SIM1 436 and by a queue SIMk 438. The queue SIM1 436 provides signaling information for a first MS, MS1, and the queue SIMk 438 provides signaling information for a kth MS, MSk. In the CSC processing path 434, the k queues are represented by a queue SIM(n+1−k) 440 that provides signaling information for MS(n+1−k), and by a queue SIMn 442 that provides SIUs for MSn. For each CSC processing path, a multiplexer 444 selects SIU(s) from the appropriate queue under control of a subframe timing signal $T_{SF}$ (not shown). The multiplexed signal information is then conveyed to a block 446 for orthogonal coding.

The first and last CSC processing paths 432 and 434 represent a number $N_P$ of such paths. Because each CSC processing path applies a different orthogonal code to the multiplexed signal information in the corresponding block 446, the number $N_P$ of different code covers are required. As such, it may be useful to configure the system so that $N_P$ comprises an integer power of 2, so as to realize efficiencies in the provision of $N_P$ different orthogonal codes.

Next, similarly as described with respect to the block diagram of FIG. 3, some or all orthogonally encoded subframe signals may be replicated in a subframe repeat block 448. If the block 448 repeats each subframe signal L times (for L-time diversity), the total number of subframes in a superframe output from the block 448 is L×k. Of course, the numerous alternatives for repetition and providing time diversity that are set forth above with respect to the block diagram of FIG. 3 may also be implemented in processing blocks that differ as necessary from the subframe repeat blocks 448.

The resulting concatenated TDM subchannels have a length of a CSC superframe. The L concatenated subchannels are conveyed via a gain block 450 to a subchannel summing block 452. Each gain block 450 imposes a gain for each subchannel, multiplexed for the superframe structure by a multiplexer (not shown), in a manner that is generally similar to that described above with respect to the block diagram of FIG. 3. The gain for each subchannel is allocated from a total gain budget that is assigned by higher level processing to the entire CSC. The gain-adjusted, concatenated TDM subchannels are summed in a block 452 to form the entire CSC, containing k×$N_P$ subchannels. The completed CSC is Walsh channelized in a block 454, then joins the other illustrated channels in the combining and spreading crossbar 402.

Very High Capacity Signaling Alternatives

The system described above with respect to the block diagram of FIGS. 3 and 4 may be scaled to convey a wide range of numbers and complexities of SIUs (signaling information units) in a single common signaling channel (CSC), for example by varying the number $N_P$ of different codes and the number k of SIUs that are time-multiplexed in each subframe to convey a total of ($N_P$*k) SIUs in each superframe period. When only one SIU is required for each targeted MS, as is the case when the SIU conveys acknowledgment information, the number of MSs that can be addressed during a single superframe (which has the same duration as a normal voice or data frame) is also ($N_P$*k).

In some applications it is useful to address a very large number of different MSs, i.e., for the number of SIU subchannels of the CSC ($N_P$*k) to be large. If the number of SIU subchannels of the CSC is sufficiently large, then an assignment of a particular SIU subchannel to an MS may be kept stable for the duration of the MS connection to a particular BS. Stability in the SIU subchannel assignment avoids the inefficiencies of sharing (and thus frequently reassigning) a limited number of SIU subchannels among a larger number of connected MSs. For example, it may be desirable to maintain nominally active connections between a BS and 1024 different MSs. Even though most of the MSs may not be transmitting data at any given time, a great deal of administrative overhead may be saved if each of the 1024 MSs remains stably assigned to a particular "subchannel" on which it will receive relevant signaling information.

Figures 5, 6:
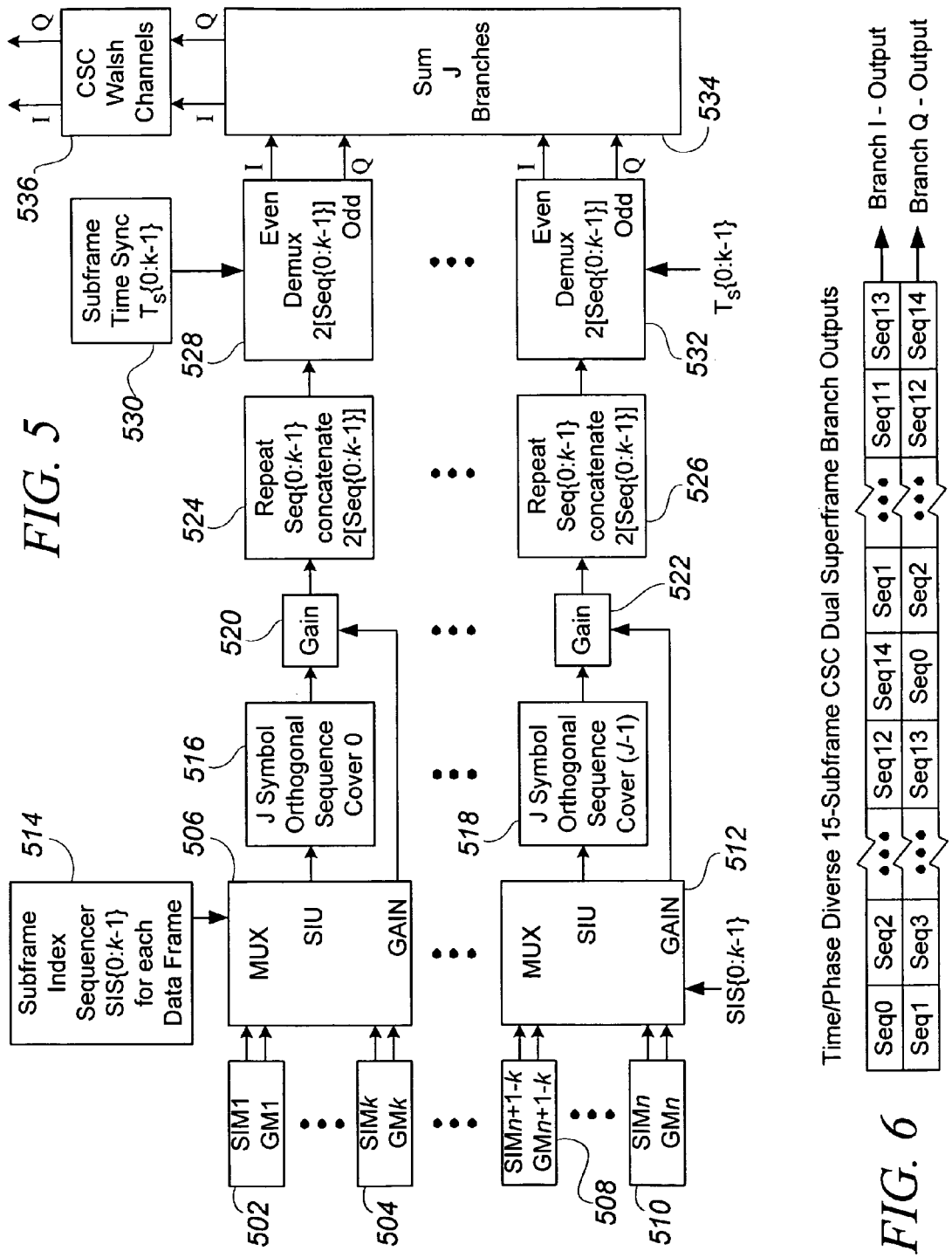
FIG. 5 is a block diagram of an alternative CSC signal preparation section for replacement of the CSC signal preparation section shown in FIG. 4.
FIG. 6 illustrates one CDM sequence arrangement for I and Q outputs of a branch of a CSC signal preparation section as shown in FIG. 5.

FIG. 5 illustrates some alternatives that may be used in conjunction with a system that is generally as illustrated and described in the block diagram of FIG. 4. FIG. 5, however, illustrates variations to the CSC (Common Signaling Channel) signal preparation sections 432, 434, 452 and 454 shown in FIG. 4.

A system as illustrated in FIG. 5 effects distribution of those SIUs associated with a particular CSC superframe (i.e., a CSC frame) to up to N different MSs. This is generally accomplished by time multiplexing: for each of J distinct code branches, K SIUs of the CSC frame are time multiplexed into K subframes, where N=J*K. Unlike in a system according to FIG. 4, however, a CSC frame for a system of FIG. 5 typically will not repeat the K subframes. Thus, a CSC frame for use in FIG. 5 is typically divided into only K TDM subframes, rather than as is more typical for a system according to FIG. 4, e.g., 2*K subframes. J, the number of different branches of processing, is typically the same as the number of orthogonal sequences available for CDM of the SIUs. N=J*K.

J and K may take on numerous values in a system as illustrated in FIG. 5, but several embodiments are of particular note. First, K may comprise fifteen (15) and J may comprise eighty (80). For CSC frames whose length is established to match 10 mS data frames, this corresponds to 10 mS CSC frames of 38,400 chips divided into 15 subframe slots of 2560 chips each. Presuming a basic orthogonal variable spreading factor (OVSF) code length of 32 chips, there are 80 "bits" in each of the fifteen slots. All 80 "bits" of a particular slot may be spread across such a slot by means of codes having a length that sums to 80. For example, four length-20 Hadamard codes may be utilized to convey four symbols to each of 20 code-defined subchannels within each such slot. However, as described in more detail hereinbelow, one may generate and utilize length-80 Hadamard codes, thereby spreading each SIU over an entire subframe (or slot) duration as a single symbol for each of 80 CDM subchannels.

This 15-subframe/80-code subchannel embodiment provides 1200 CSC "subchannels" that may each be addressably directed to a particular corresponding target MS during a single frame (e.g., 10 mS) of the CSC. The target MS may identify a subchannel directed to it by its particular combination of OVSF (e.g., a length-32 Walsh code), orthogonal sequence covering code (e.g., a length-80 Hadamard matrix sequence), subframe number (e.g., one of fifteen subframes), and the signal phasing (e.g., I or Q). These variables are sufficient to identify 2400 distinct subunits, but one level of redundancy for each SIU is preferred in some embodiments, as described further below, resulting in 1200 distinct CSC subchannels.

An SIU addressed to a particular MS (i.e., conforming to the addressing factors above), may convey information by implication. For example, the timing of the particular CSC frame in which the SIU is disposed may, by predetermined timing convention, unambiguously associate the SIU to a particular data or voice-channel frame. If the SIU is used for acknowledgment of data that is transmitted to the BS from the target MS (as in one embodiment), the arrival time of the containing CSC frame reliably indicates which data frame from the MS is being acknowledged by the SIU, in accordance with a predetermined convention.

In one version of a 1200-subchannel embodiment, the 1200 subchannels are distributed over I and Q subchannels (other subchannels could be used) of a basic Walsh channel of the CSC. Because each of the Walsh subchannels conveys 80 SIUs in each of 15 subframe slots, the total SIU capacity comprises 2400 bits. However, only 1200 unique SIU subchannels are conveyed in one embodiment, and each SIU is repeated once for increased reliability. In particular, in one embodiment, each SIU is repeated during a different, non-overlapping time slot (subframe) within the relevant CSC superframe, providing time diversity of 2 for each of the 1200 subchannels. The repetition of each subchannel may not only occur at different times, but on a different Walsh subchannel (I vs. Q, or more generally Walsh subchannel A vs. Walsh subchannel B), providing a high degree of reliability. As described below in more detail, the exemplary processing of FIG. 5 distributes fifteen duplicate pairs of SIU sequences over both time and Walsh subchannel, disposing them as shown in FIG. 6.

Each of the 1200 CSC subchannels may be provided with a distinct gain that is independently selectable to be appropriate for the corresponding MS to which the CSC subchannel is directed. Also, when less than 1200 MS connections are active, unneeded SIU subchannels may usefully be employed to provide further SIU redundancy for MSs that either have marginal signal strength, or that are provided with a higher quality of service (QoS).

In FIG. 5, the blocks 502 and 504 represent SIUs and gains associated with a first K MSs. The K SIUs are multiplexed by means of a multiplexer 506 into a sequence of K subframe data units under the control of a subframe index sequencer (SIS) 514. For each data frame, the SIS provides a signal "SIS{0:k−1}" that controls the multiplexer to arrange a sequence of SIUs from 0:(K−1). The CSC signal processing branch that begins with the blocks 502 to 504 is repeated a total of J times, where J comprises the number of orthogonal sequences used. The blocks 508 and 510 represent the last K MSs for which SIUs are conveyed, from MS index N+1−K to MS index N. For maximum capacity, with time diversity effected by use of I and Q subchannels, N may comprise J*K. However, other values for N are possible as described hereinbelow.

Of the J CSC signal preparation branches represented in FIG. 5, only the first branch (beginning with the blocks 502 and 504) and the last branch (beginning with the blocks 508 and 510) are illustrated. In the first signal preparation branch, the number K of MSs for which SIUs and gain are represented by the blocks 502 and 504 may, as examples, comprise 15, 16 or 18. The selected number K, in turn, determines the number of subframes within each CSC superframe. The sequence of K SIUs, from {0:k−1}, that is provided by the multiplexer 506 is provided to a block 516 in which each SIU is converted to a representation as an orthogonal code (in this case, the first, or "0" code) having a length of J "bits." As each J-bit sequence (symbol) is generated in the block 516 for an SIU associated with a particular MS (index), a corresponding gain may be applied at a block 520.

A series of K sequences thus arrives at a block 524, at which point the entire series of sequences is replicated as a concatenated series of 2K sequences. Thereupon, the concatenated sequence series, complete with appropriate gain, enters a demultiplexer 528, where it is distributed to separate subchannels (I and Q subchannels, as shown, or other A and B subchannels). The original series, as concatenated in the block 524, includes Seq0 . . . Seq14, followed again by Seq0 . . . Seq14. These are distributed according to their even-odd position in the entire series to an I and a Q output from the branch. By so doing, the number of sequences is increased to 2K, and then divided between two subchannels, resulting in K subframes. The timing for the K subframes is provided by a subframe time synchronization block 530, which provides a timing alignment for the subframes in the form of $T_S \{0:(K-1)\}$.

FIG. 6 illustrates the effect of the blocks 524 and 528 in one embodiment of a CSC CDM branch. As can be seen, a particular sequence, such as a sequence Seq0 (which may comprise a single CDM symbol), is distributed first to the Walsh channel I. Then, approximately halfway through the entire superframe period, a repetition of the sequence Seq0 is distributed to the Walsh channel Q.

Many other practical arrangements for providing diversity are possible, at least some of which similarly provide dual diversity of both time and a second parameter. Such second diversity may be effected, for example, by varying the Walsh channel or subchannel via which a CDM symbol representing an SIU is transmitted (as illustrated in FIG. 6). In another embodiment, such second diversity may be effected by varying the CDM sequence that is used to represent the particular SIU in the different time slots of the CSC frame.

Returning to FIG. 5, the subchannel I and Q outputs from the demultiplexer block 528 is maintained through a summing block 534 that sums the results of the J CSC signal preparation branches. The I and Q subchannels are also maintained through a Walsh channelizing block 536 that applies the basic Walsh OVSF code (e.g., length–32). The output from the Walsh channelizing block 536 proceeds into transmission circuitry such as is represented in FIG. 4 by the block 402.

The remainder of the J CSC signal preparation branches are represented in FIG. 5 by the last branch, beginning with the SIU/gain blocks 508 and 510. These blocks provide the SIUs and gains associated with the last K MS indexes, N+1−K to N, where N is typically J*K, though many alternatives are possible, one of which is described below. These K SIU/gain pairs are multiplexed into a sequence in a multiplexer block 512 under control of the sequencing signal SIS{0:k−1} from the SIS block 514. This last series of K SIUs is then orthogonally coded (according to the last available code J-1) in a block 518, and relative gain is imposed on the completed sequence in a gain block 522.

The entire series of K CDM sequences with gain is then repeated in a block 526. Note that this block 526 is primarily conceptual in nature. In actual practice, it is likely that neither the block 524 nor the block 526 would exist as separate blocks (either physically, or as algorithmic steps). Instead, as a practical matter, the entire process, up to and including the gain blocks (520, 522), might be repeated twice in succession. The net effect, in either event, is for a concatenated series of 2K sequences to be input into a demultiplexer block 532. There, under the subframe timing control of $T_S\{0:(K-1)\}$ output from the block 530, the duplicated sequences are distributed between two different subchannels (e.g., I and Q), for example in the manner represented in FIG. 6. These two branch outputs are summed with the similar subchannel outputs from the other J-1 branches of CSC signal preparation in the block 534, thereafter proceeding as described above for branch 0.

The CSC of FIG. 5 comprises a single (Walsh) channel, because it ultimately is spread using a single orthogonal variable spreading factor (e.g., OVSF, or Walsh) code. The illustrated CSC takes advantage of phase shifting, employing two major subchannels of the same OVSF channel (I and Q subchannels are illustrated), to provide dual diversity of time and Walsh subchannel. However, dual diversity may be provided without using I & Q subchannels. For example, diversity of time and OVSF code may be employed rather than diversity of time and phase. Other factors being unchanged, half as many CSC subchannels (J*K/2) result. In some embodiments, the blocks shown in FIG. 5 may be rearranged.

The blocks 524 (526) and 528 (532) may be moved to new positions immediately after the blocks 506 (512), prior to the blocks 516 (518) and 520 (522). The "even" and "odd" outputs from the demultiplexing block 528 (532) may then be encoded according to different orthogonal sequence covers 0 and 1 (J-2 and J-1) in blocks similar to 516 (518). Of course, because two orthogonal codes are required for each processing branch, this permits only J/2 processing branches for J available orthogonal sequences. That is, instead of conveying information for MSs indexed from 1 to (J)(K), (i.e., providing JK signaling subchannels), half that number of MSs may be serviced. SIM1:SIMn may be serviced, but n may be JK/2, rather than JK. Utilizing different codes, rather than different phases, may thus be used in another embodiment of the method to transmit SIUs with dual diversity.

Figure 7:
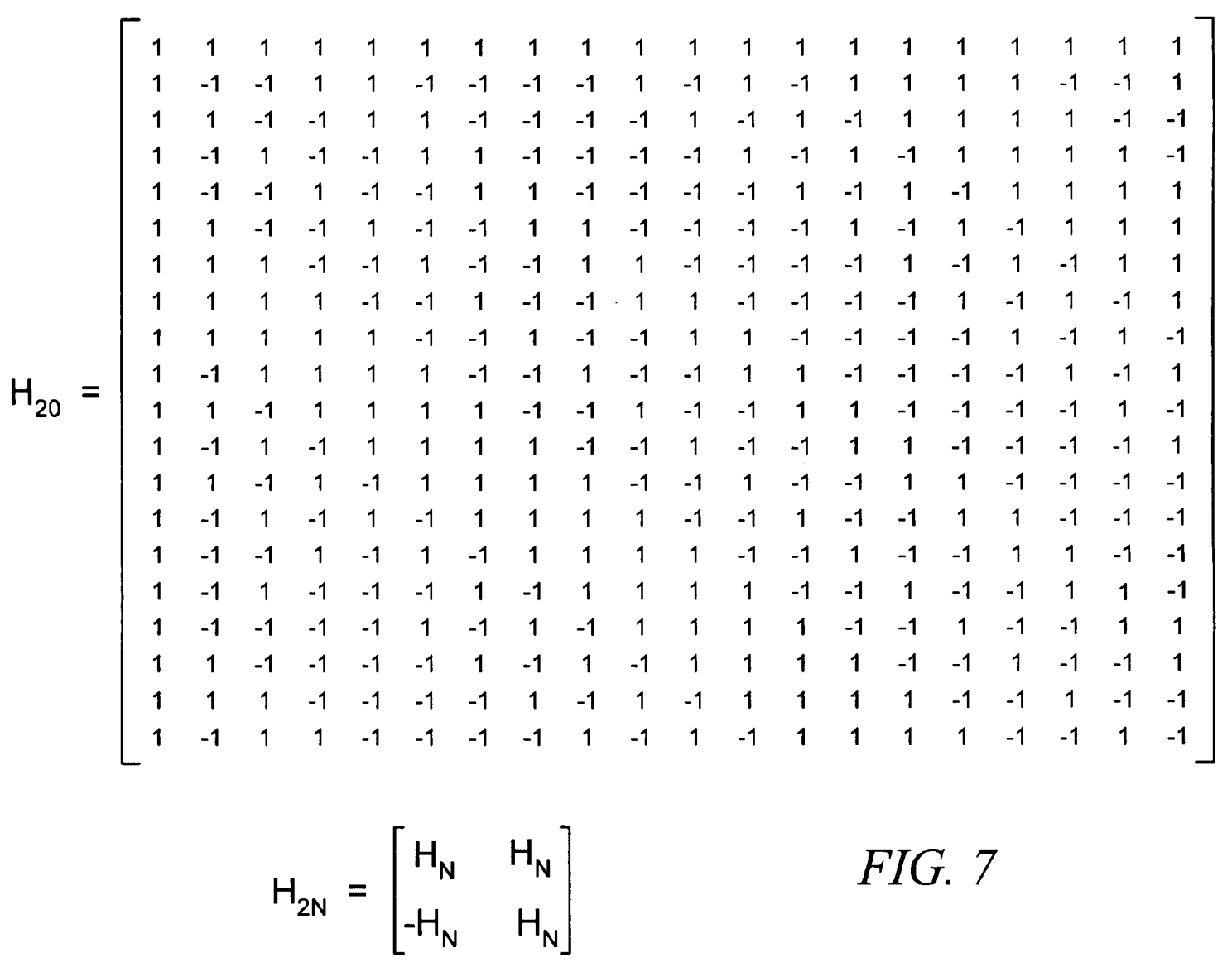

FIG. 7 illustrates the generation of Hadamard codes of length $20(2^N)$ for N being a positive integer. The well known Paley's Construction may be used to generate a 20×20 Hadamard matrix as shown in FIG. 7. Once orthogonal codes of length 20 are thus identified, the length may be increased by factors of two using the familiar Sylvester's construction method, which is also represented in FIG. 7. In two steps, the length-80 codes may be generated for use in certain of the embodiments described herein.

Because a length-80 Hadamard code is derived from a length-20 matrix, a cascaded match filter may be designed for the receiver. Such a filter begins with a length-20 match filter that accords with the appropriate length-20 Hadamard code, followed by a decimated fast Hadamard transformation (FHT) operation. This is somewhat more complex than a corresponding integer-power-of-two match filter.

Other embodiments of a system according to FIG. 5 avoid the above described difficulties by employing traditional Hadamard codes having integer power of 2 lengths (length-$2^N$ CDM codes), at an expense of a slightly reduced usage efficiency and an increased peak-to-average ratio. Two such embodiments are particularly noted, both of which somewhat reduce the complexity of the coding scheme in the transmitter, which may permit corresponding simplicity for decoding at the receiver. According to a first of these embodiments, it is preferred to make K equal to sixteen (16), and J equal to sixty four (64). However, a CSC superframe according to this embodiment does not actually use all of the chips (i.e., available time) available in the basic data frame to which the CSC superframe is related. With K=16 and J=64, and presuming a length-32 basic Walsh spreading, only 32768 of 38400 available chips are employed. This is likely to result in a somewhat elevated transmission power peak/average ratio, depending upon the actual implementation.

Another embodiment, similar to the embodiment described above but with K extended to 18, somewhat improves the peak/average ratio. 1152 CSC subchannels are produced by setting K=18 and J=64, resulting in 1152 CSC subchannels. Diversity may be obtained as shown in FIGS. 5 and 6. 1152 CSC subchannels, for example, support 1024 MSs, while having 128 "extra" subchannels available to provide further redundancy for SIUs transmitted to MSs having a higher QoS contract, or a lower signal strength.

CONCLUSION

The foregoing description illustrates exemplary implementations, and novel features, of aspects of a method and apparatus for hybrid CDM/TDM signaling, providing an efficient CSC, such as may be employed as a F-CACKCH in an exemplary CDMA communications system. However, the method and apparatus may be employed to convey a wide variety of signaling information. SIUs may, for example, correspond to future data frames, rather than previous data frames, or to data frames transmitted from the BS to an MS rather than from an MS to the BS. For example, SIUs may indicate that a particular MS receives a data packet from the BS at an implicit future time (wake-up), thus permitting the MS to ignore data channels unless data is actually being sent to the MS. SIUs may also convey information that is relevant to particular future packets, reflecting parameters such as modulation and/or coding and thereby facilitating efficient decoding of such packets by the MS, even when the parameters are varied from frame to frame. Because methods and apparatus as described herein are adaptable for an extremely wide range of different signaling needs, whether presently recognized or not, it is impractical to list all alternative implementations of the method or apparatus. Therefore, the scope of the presented invention can only be determined by reference to the appended claims, and is not to be limited by features illustrated in the foregoing description except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope or spirit of the invention.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention is properly defined by the appended claims rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of transmitting a multiplicity of signaling information units (SIUs) from a base station (BS) to a corresponding multiplicity of receiving mobile stations (RMSs) via a common signaling channel (CSC), wherein data is communicated between each RMS and the BS via primary data frames of one or more other channels in a quantity substantially larger than is conveyed by corresponding SIUs, the method comprising:

a) identifying corresponding primary data frames to which the multiplicity of SIUs are relevant, the primary frames having a primary frame duration;

b) transmitting the multiplicity of SIUs in a CSC frame having a duration shorter than or approximately equal to the primary frame duration during a time period selected to imply relevance of the SIU to the corresponding primary frames;

c) dividing the CSC frame into a multiplicity of subframes to effect time division multiplexing (TDM) of the CSC frame; and d) for each of the multiplicity of SIUs, disposing within a subframe of the CSC frame a corresponding code division multiplexing (CDM) sequence representing such SIU and distinguishing it from other SIUs disposed in the same subframe, wherein the CSC is distinguished from other channels transmitted from the BS within a substantially identical frequency range by a unique orthogonal variable spreading factor (OVSF) code.

2. The method of claim 1, wherein step (d) further comprises, for each of the multiplicity of SIUs, disposing two or more CDM sequences representing such SIU in different subframes within the CSC frame.

3. The method of claim 2, wherein the CSC OVSF channel includes a plurality of phase distinguished subchannels.

4. The method of claim 3, further comprising transmitting the two or more CDM sequences of each of the SIUs on different phase-distinguished subchannels of the CSC OVSF channel.

5. The method of claim 4, wherein step (c) further comprises dividing the CSC frame into 15 subframes, and wherein the CDM sequences representing SIUs have a length of 80 code units.

6. The method of claim 4, wherein step (c) further comprises dividing the CSC frame into 16 subframes, and wherein the CDM sequences representing SIUs have a length of 64 code units.

7. The method of claim 4, wherein step (c) further comprises dividing the CSC frame into 18 subframes, and wherein the CDM sequences representing SIUs have a length of 64 code units.

8. The method of claim 2, wherein a number of SIU repetitions is the number of CDM sequences within a CSC frame representing a particular SIU directed to an RMS, and wherein the number of SIU repetitions for an SIU directed to a first RMS is different from the number of SIU repetitions for an SIU directed to a different second RMS.

9. The method of claim 4, wherein step (d) further comprises, for each of the SIUs, transmitting a corresponding representative CDM sequence during a first time period on an I-subchannel of the CSC, and transmitting the corresponding representative CDM sequence during a different second time period on a Q-subchannel of the CSC.

10. The method of claim 1, wherein the corresponding code division multiplexing (CDM) sequence that represents each of the multiplicity of SIUs has a length unequal to $2^N$, N a positive integer.

11. The method of claim 10, wherein the corresponding code division multiplexing (CDM) sequence that represents each of the multiplicity of SIUs has a length equal to $2^N*20$, N a non-negative integer.

12. The method of claim 1, wherein the corresponding code division multiplexing (CDM) sequence that represents each of the multiplicity of SIUs has a length equal to $2^N$, N a positive integer.

13. The method of claim 1, wherein the SIUs comprise acknowledgement information relevant to automatic data retransmission procedures.

14. The method of claim 1, wherein each SIU transmitted from the BS to a particular RMS corresponds to a single CDM symbol and conveys only acknowledgment information regarding data transmitted from the particular RMS to the BS.

15. The method of claim 1, wherein the SIUs encoded within a particular CSC frame each convey information about data transmitted by a particular RMS during a primary frame having a common duration and a predetermined time offset with respect to the particular CSC frame.

16. Cellular communication system base station (BS) apparatus for high-speed data communication with a multiplicity of mobile station (MS) receivers, the apparatus comprising:

a) a data channel frame analysis module configured to determine duration and time alignment for primary frames of a multiplicity of data channels; and b) a common signaling channel (CSC) signal preparation module configured to prepare a signal segment to convey a multiplicity of different signaling information units (SIUs), each corresponding to one of the multiplicity of data channels, for transmission from the BS as a particular frame on the CSC, the CSC signal preparation module including i) a time division multiplexing (TDM) module configured to dispose SIUs into a plurality of different subframes within a CSC frame implicitly corresponding to the primary frames of the corresponding data channel, ii) a coding module configured to encode each SIU as a code division multiplexed (CDM) symbol, iii) a time diversity module configured to dispose a CDM symbol representing each SIU in a plurality of different subframes of the CSC frame, iv) a plurality of CDM branch concatenation modules each configured to concatenate CDM symbols based on a particular orthogonal sequence cover for all subframes of the CSC frame as CDM branch frame sequences, and v) a summation module configured to sum a plurality of CDM branch frame sequences to establish a signal segment conveying the CSC frame information.

17. The apparatus of claim 16, further comprising (b)(vi) a distribution module configured to distribute each CDM branch frame sequence between a plurality of different CSC subchannels.

18. The apparatus of claim 16, wherein the CDM symbol encoded for each SIU by the coding module has a length of $20*2^N$ code units, N a nonnegative integer.

19. The apparatus of claim 18, wherein the CSC utilizes a single orthogonal variable spreading factor (OVSF) code, the CSC frame has a duration of about 10 mS and is divided into 15 TDM subframes, N=2, each CDM branch frame sequence encompasses 30 CDM symbols including 2 CDM symbols representing each of 15 SIUs, and each CDM branch frame sequence is distributed between two different subchannels of the CSC channel.

20. The apparatus of claim 18, wherein the SIUs comprise acknowledgement information relevant to automatic data retransmission procedures, and each SIU is represented by a single CDM symbol.

21. The apparatus of claim 18, wherein for each SIU at least two representative CDM symbols are disposed in different CSC frames for diversity.

22. A method of transmitting a multiplicity of signaling information units (SIUs) from a base station (BS) to a corresponding multiplicity of receiving mobile stations (RMSs) via a common signaling channel (CSC), wherein data is communicated between each RMS and the BS via primary data frames of one or more other channels in a quantity substantially larger than is conveyed by corresponding SIUs, the method comprising:

a) a step for identifying corresponding primary data frames to which the multiplicity of SIUs are relevant, the primary frames having a primary frame duration;

b) a step for transmitting the multiplicity of SIUs in a CSC frame having a duration approximately equal to the primary frame duration during a time period selected to imply relevance of the SIU to the corresponding primary frames;

c) a step for dividing the CSC frame into a multiplicity of subframes to effect time division multiplexing (TDM) of the CSC frame; and d) for each of the multiplicity of SIUs, a step for disposing within a subframe of the CSC frame a corresponding code division multiplexing (CDM) sequence representing such SIU and distinguishing it from other SIUs disposed in the same subframe, wherein the CSC is distinguished from other channels transmitted from the BS within a substantially identical frequency range by a unique orthogonal variable spreading factor (OVSF) code.

* * * * *